Patented Oct. 31, 1939

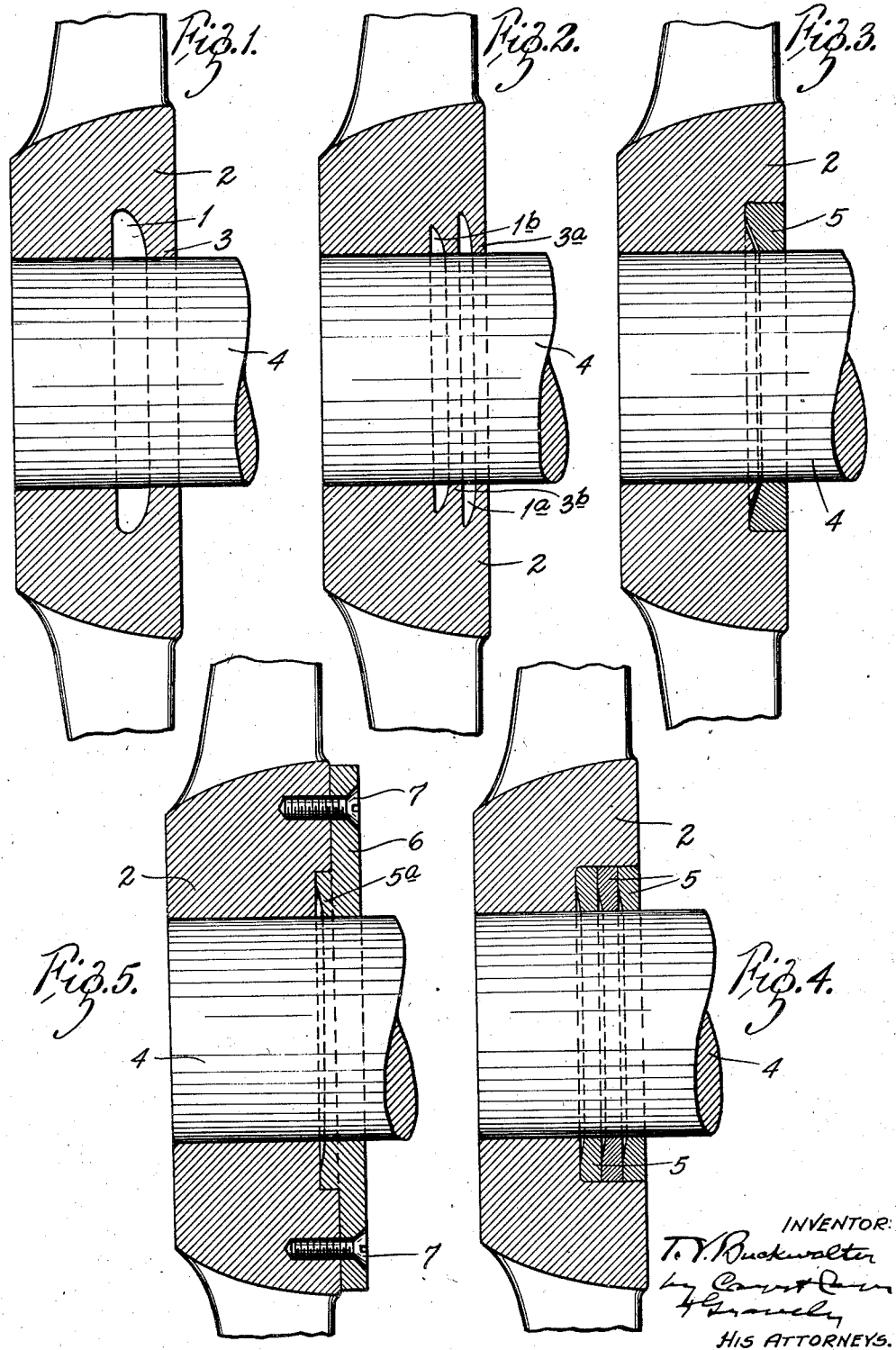

2,177,924

UNITED STATES PATENT OFFICE 2,177,924

WHEEL AND AXLE ASSEMBLY

Tracy V. Buckwalter, Canton, Ohio, assignor to The Timken Roller Bearing Company, Canton, Ohio, a corporation of Ohio Application July 24, 1937, Serial No. 155,511

7 Claims. (Cl. 287—52)

My invention relates to constructions of the kind wherein a wheel, collar or other member is tightly fitted, as by shrinking or press fitting, on an axle or shaft which rotates and is thus subject to continuous reversal of cross bending stress. Practical experience and laboratory tests show that such an axle or shaft will become fatigued and ultimately break substantially in a plane slightly inwardly of that face of the hub which is next to the transversely loaded portion of the shaft. The object of the present invention is to minimize the tendency of the axle to become fatigued and fracture at the place mentioned. The invention consists principally in forming an annular groove in the face of the bore of the hub at such distance inwardly from said face thereof that the intervening band will be wide enough to maintain an adequate grip on the shaft but will be narrow enough to flex and yield elastically and thereby avoid molecular attrition and cause the transfer, to the portion of the hub on the outer side of said groove, of a portion of the stress that would otherwise have to be resisted by said intervening band. It also includes the idea of rigidly mounting one or more separate eye rings in the bore of the hub with their inner surfaces flush with the surface of the bore of the main hub member and all tightly fitted on the axle. It also consists in the combinations and arrangements of parts hereinafter described and claimed.

In the accompanying drawing, wherein like reference numerals refer to like parts wherever they occur, Fig. 1 is a view of the hub portion of a wheel and axle assembly showing the hub in section on the end portion of an axle; and Figs. 2, 3, 4 and 5 are similar views illustrating modifications of construction.

The common practice of mounting locomotive wheels on their axles is to make the bore of the wheel hub slightly smaller in diameter than the diameter of the wheel seat of the axle and to force the wheel onto said seat by means of a heavy hydraulic press. The result is that the axle is permanently subject to the hoop stress caused therein by the tight-fitting hub and is also subject to the beam stresses which are due to vertical load and which are continually reversing on account of the rotation of the axle. There results a tendency for the axle to break in a plane slightly inwardly from the inner face of the hub, that is, slightly inwardly of that face of the hub which is next to the vertically loaded or otherwise most highly stressed portion of the axle.

According to the present invention, an annular groove 1 is formed in the wall of the bore of the wheel hub 2, leaving a relatively narrow tight-fitting band 3 between the groove 1 and the inner face of the hub 2. The purpose of this groove is to enable the end band 3 to flex and yield elastically somewhat under vertical load or transverse stress on the axle 4 and thereby cause a portion of such load to be applied to the portion of the hub beyond or on the opposite side of the groove. The provision of the groove thus avoids the destructive concentration of stress incident to the old construction and reduces the unit stress by increasing the area of resistance.

The width of the tight fitting band 3 between the inner face of the hub and the groove therein should be wide enough to maintain a tight fit of the axle 4 in the hub; but it should be narrow enough to flex and yield elastically to the stress imposed thereon by the vertical or transverse load on the axle. This yielding of the end band of the hub is very slight but it is effective in bringing the portion of the axle next beyond the groove into operation in taking care of the portion of the stress which the outer portion of the end band would otherwise have to take alone. When the end band flexes or yields elastically, the axle deflects continuously as a simple beam and the portion of the hub next beyond the groove cooperates directly with the end band in taking care of the beam stresses. Besides, such yielding minimizes the molecular attrition of the axle caused by rubbing back and forth in the hub of the wheel due to the continuously changing deflection of the axle.

By way of example, the following is a comparison of a test of a wheel and axle assembly embodying my invention with another wheel and axle assembly made of the same material and of the same dimensions, but omitting the stress relief groove in the hub of the wheel seat of the axle. The axles in both assemblies were of a diameter of two inches. In the assembly according to my invention, the press fit of the grooved wheel on the axle was .007 inch in comparison with .0017 inch for the press fit of the plain or ungrooved wheel on its axle. Both assemblies were tested in the same machine wherein they were continuously rotated while subject to a vertical load of 19,500 pounds. At the end of 3,100,000 reversals of the stress, which is equivalent to 11,300 miles for wheels of 72 inch diameter, the axle in the plain hub broke in two, inside of the wheel hub close to that end of the hub which was next to the loaded portion of the axle. In contrast with this, the assembly embodying my invention was reversed 83,700,000 times (equivalent to 298,000 miles for a 72 inch wheel) and was still in fair condition as it then had only surface cracks of about .005 inch deep on one side of the groove and about .010 inch deep on the other side.

In the grooved wheel used in said test, the groove in the bore of the hub was about ¼ inch from the inner end face of the hub, and was about ¼ inch wide at the surface and 1 inch deep, the front wall of the groove curving inwardly.

The foregoing description is based on the construction shown in Fig. 1 wherein the hub of the wheel is integral and provided with a single relief groove near that end which is next to the loaded portion of the axle. In some cases, it may be advantageous to use two grooves 1a and 1b and thus form two or even more flexible or elastic bands 3a, 3b, as shown in Fig. 2, instead of one. In this case, both the bands 3a and 3b yield after the manner of the single band 3 of Fig. 1, as hereinbefore described.

Instead of forming a groove in the bore of the wheel hub, the end of the bore of the hub may be enlarged or counterbored and an eye ring 5 may be press-fitted or otherwise rigidly mounted in the counterbore with its inner cylindrical surface flush with the surface of the bore of the main hub member of the wheel construction, as shown in Figs. 3, 4 and 5. In the modification illustrated in Fig. 3, the exterior portion of the eye ring 5 is thicker than the interior portion thereof and a slight space is left between its inner end face and the adjacent portion of the main hub member. The modification illustrated in Fig. 4 comprises a plurality of eye rings 5 press-fitted into the counterbore of the main hub member with the interior portion of their side faces spaced slightly apart. In the modification illustrated in Fig. 5, the main hub member is counterbored and a ring member 6 has a portion 5a which is preferably press-fitted in said counterbore and a portion integral therewith and of larger diameter which overlaps the end of the main hub member and is secured thereto by screws 7.

In those modified constructions wherein the main hub member has separate eye rings or the like rigidly secured thereto, such rings operate after the manner of the integral band 3 of Fig. 1. That is, the eye rings have a tight frictional grip on the axle and transmit stress therefrom to the cylindrical surface of the counterbore of the main hub member of the wheel, but said eye rings flex or yield elastically and thus expose the adjacent cylindrical surface of the main bore to the stress imposed by the axle. Thus the use of an eye ring in the hub of a wheel breaks the continuity of the surface contact between the axle and the wheel structure and relieves the stress in the same manner as the use of the relief groove in an integral hub.

While I have described my invention as applied to locomotive driving wheels and axles, it is of general application to assemblies wherein wheels, pulleys, collars, bearing cones and the like are shrunk or press-fitted on axles, shafts or the like which are subject to continually reversing bending stresses.

What I claim is:

1. A wheel and axle assembly wherein a wheel construction has a press fit on the axle, the axle engaging surface of said wheel construction comprising two cylindrical bands which are separated from each other by an intervening gap, namely, a relatively long main band and a relatively short band, the short band being materially narrower than the depth of the gap and being located at the end next to the highest stressed portion of the axle.

2. A wheel and axle assembly wherein the hub of the wheel is press-fitted on the axle, said wheel having an annular relief groove in the bore of the hub thereof near that end of the bore which is next to the loaded portion of the axle, and the portion of the hub between said groove and said end of the hub being of such dimensions that it will yield elastically under the pressure of the axle due to transverse loading.

3. A wheel and axle assembly wherein the hub of the wheel is press-fitted on a seat on the axle, said wheel having a plurality of annular relief grooves in the bore of the hub thereof near that end of the bore which is next to the highest stressed portion of the axle.

4. A wheel and axle assembly wherein the hub of the wheel is press-fitted on a seat on the axle, said wheel hub having a flexible face portion defined by a face of the wheel and a spaced annular groove, said annular groove being in the wall of the bore and adjacent to but spaced from that end of the wheel bore which is next to the highest stressed portion of the axle.

5. A wheel and axle assembly wherein the bore in the hub of said wheel is divided into two or more frictionally holding bands whose axle engaging surfaces are spaced apart longitudinally of said axle, one of said bands being relatively rigid and of considerable length and another band being flexible and of relatively short length and located adjacent to the most highly stressed portion of the axle.

6. A wheel and axle assembly wherein the hub of a wheel has a bore and a counterbore and a relatively short eye ring rigidly mounted in said counterbore with its inner surface flush with the surface of said bore and both said hub and said eye ring being press-fitted on the axle with a break in the continuity of their surface contact with the axle, said eye ring being at that end of the hub which is next to the highest stressed portion of the axle, the wall thickness of said eye ring in a radial direction being greater than the longitudinal dimension thereof.

7. A wheel and axle assembly wherein the wheel is press-fitted on a seat on the axle, and is provided with groove means within the bore of the wheel hub for dividing the stress concentration into two or more separate bands spaced apart longitudinally of the axle.

TRACY V. BUCKWALTER.